United States Patent
Wang et al.

(10) Patent No.: US 11,550,033 B2
(45) Date of Patent: Jan. 10, 2023

(54) ELECTRO-OPTICAL BEAM DEFLECTING UNIT FOR LIGHT DETECTION AND RANGING (LIDAR)

(71) Applicant: BEIJING VOYAGER TECHNOLOGY CO., LTD., Beijing (CN)

(72) Inventors: Chao Wang, Mountain View, CA (US); Lingkai Kong, Mountain View, CA (US); Yonghong Guo, Mountain View, CA (US); Wenbin Zhu, Mountain View, CA (US)

(73) Assignee: BEIJING VOYAGER TECHNOLOGY CO., LTD., Beijing (CN)

(*) Notice: Subject to any disclaimer, the term of this patent is extended or adjusted under 35 U.S.C. 154(b) by 385 days.

(21) Appl. No.: 16/886,593

(22) Filed: May 28, 2020

(65) Prior Publication Data

US 2021/0373128 A1 Dec. 2, 2021

(51) Int. Cl.
*G01S 7/48* (2006.01)
*G01S 7/481* (2006.01)
*G01S 17/931* (2020.01)

(52) U.S. Cl.
CPC .......... *G01S 7/4804* (2013.01); *G01S 7/4812* (2013.01); *G01S 7/4813* (2013.01); *G01S 17/931* (2020.01)

(58) Field of Classification Search
CPC ...... G01S 17/93; G01S 17/931; G01S 7/4804; G01S 7/4812; G01S 7/4813
See application file for complete search history.

(56) References Cited

U.S. PATENT DOCUMENTS

| | | | | |
|---|---|---|---|---|
| 3,357,771 A | * | 12/1967 | Buhrer | G02F 1/29 359/315 |
| 3,512,876 A | * | 5/1970 | Marks | G02F 1/172 359/296 |
| 3,741,629 A | * | 6/1973 | Kahn | G02F 1/134309 349/193 |
| 3,910,680 A | * | 10/1975 | Kakeda | G02F 1/1393 349/177 |
| 4,765,703 A | * | 8/1988 | Suzuki | G02F 1/3137 385/33 |
| 5,150,241 A | * | 9/1992 | Joffre | G02F 1/292 349/95 |
| 5,394,412 A | * | 2/1995 | Huignard | H01S 3/101 372/27 |

(Continued)

FOREIGN PATENT DOCUMENTS

WO WO-2017154910 A1 * 9/2017 ............ G01S 17/93

*Primary Examiner* — Peter M Bythrow
(74) *Attorney, Agent, or Firm* — Bayes PLLC

(57) ABSTRACT

Embodiments of the disclosure provide receivers for light detection and ranging (LiDAR). In an example, a receiver includes a beam converging device and an EO beam deflecting unit. The beam converging device is configured to receive a laser beam from an object being scanned by the LiDAR and form an input laser beam. The EO beam deflecting unit is configured to generate a non-uniform medium having at least one of a refractive index gradient or a diffraction grating, receive the input laser beam such that the input laser beam impinges upon the non-uniform medium, and form an output laser beam towards a photosensor. An angle between the input and the output laser beams is nonzero.

20 Claims, 10 Drawing Sheets

(56) References Cited

U.S. PATENT DOCUMENTS

| | | | | |
|---|---|---|---|---|
| 7,532,311 | B2* | 5/2009 | Henderson | G01S 17/89 356/28 |
| 7,570,320 | B1* | 8/2009 | Anderson | G02F 1/1326 349/63 |
| 7,720,116 | B2* | 5/2010 | Anderson | H01S 5/143 372/20 |
| 8,860,897 | B1* | 10/2014 | Anderson | G02F 1/1326 349/17 |
| 9,041,915 | B2* | 5/2015 | Earhart | G01S 17/894 356/3.01 |
| 9,366,938 | B1* | 6/2016 | Anderson | G02F 1/2955 |
| 9,575,341 | B2* | 2/2017 | Heck | G01S 7/4817 |
| 9,989,822 | B2* | 6/2018 | Galstian | G02B 3/0006 |
| 10,120,261 | B2* | 11/2018 | Ziemkiewicz | G02F 1/2955 |
| 10,133,083 | B1* | 11/2018 | Ziemkiewicz | G02F 1/2955 |
| 10,197,676 | B2* | 2/2019 | Slobodyanyuk | G01S 7/4817 |
| 10,261,390 | B2* | 4/2019 | Kim | G02F 1/2955 |
| 10,338,220 | B1* | 7/2019 | Raring | G01S 7/4817 |
| 10,401,481 | B2* | 9/2019 | Campbell | G01S 17/931 |
| 10,641,873 | B2* | 5/2020 | Dussan | G01S 7/4868 |
| 10,656,498 | B2* | 5/2020 | Kim | G01S 7/4814 |
| 10,754,012 | B2* | 8/2020 | Galloway | G02B 26/124 |
| 10,802,221 | B1* | 10/2020 | Murano | G02B 6/29389 |
| 10,915,004 | B2* | 2/2021 | Myers | G02F 1/295 |
| 10,976,579 | B2* | 4/2021 | Ziemkiewicz | G02F 1/011 |
| 11,156,716 | B1* | 10/2021 | Yavid | G01S 7/4863 |
| 11,163,207 | B2* | 11/2021 | Frantz | G02F 1/292 |
| 11,320,535 | B2* | 5/2022 | Weinberg | G02B 5/10 |
| 11,378,689 | B2* | 7/2022 | Dunn | G01S 17/89 |
| 2010/0208244 | A1* | 8/2010 | Earhart | G01S 17/894 356/139.01 |
| 2012/0044476 | A1* | 2/2012 | Earhart | G01S 17/58 356/4.01 |
| 2015/0309175 | A1* | 10/2015 | Hinderling | G01S 7/4816 356/4.01 |
| 2017/0184450 | A1* | 6/2017 | Doylend | G01S 17/42 |
| 2020/0081449 | A1* | 3/2020 | Albelo | G01S 7/487 |
| 2020/0309919 | A1* | 10/2020 | Nishiwaki | G01S 7/4812 |
| 2021/0318439 | A1* | 10/2021 | Yavid | G01S 7/4863 |

* cited by examiner

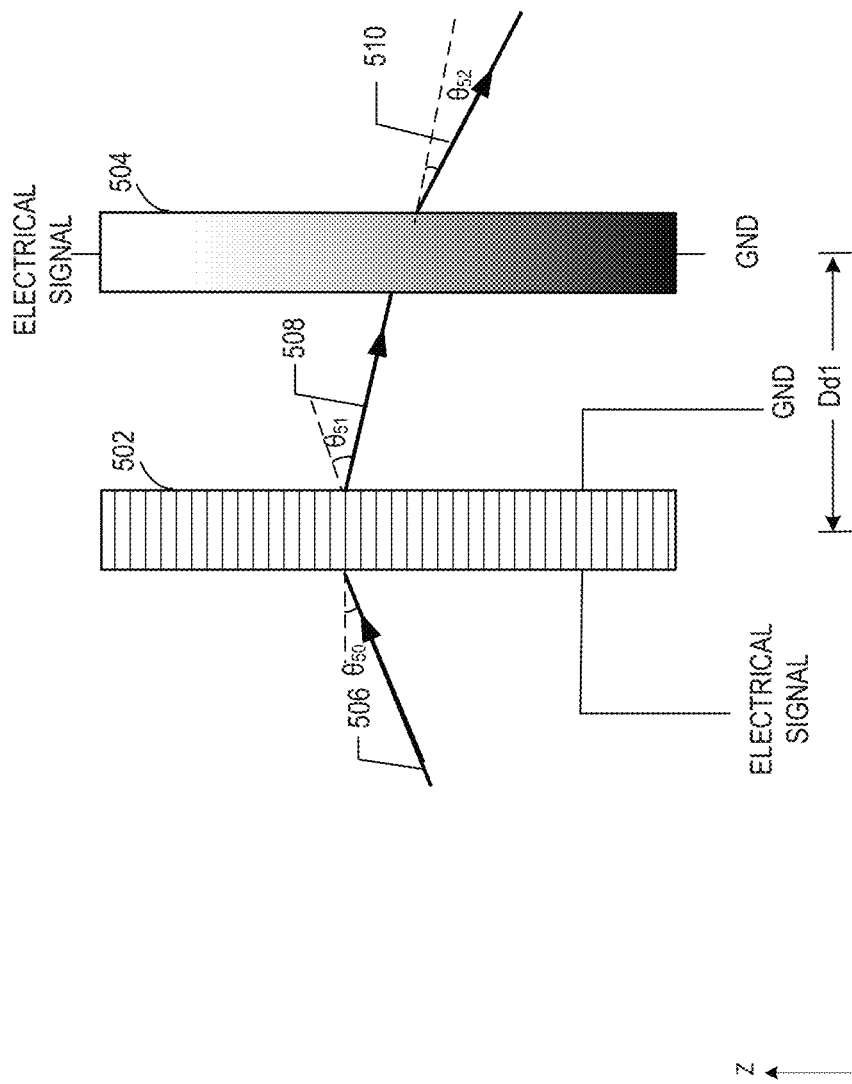

ELECTRO-OPTICAL BEAM DEFLECTING UNIT FOR LIGHT DETECTION AND RANGING (LIDAR)

TECHNICAL FIELD

The present disclosure relates to a Light Detection and Ranging (LiDAR) system, and more particularly to a LiDAR receiver having an electro-optical (EO) beam deflecting unit.

BACKGROUND

LiDAR systems have been widely used in autonomous driving and producing high-definition maps. For example, LiDAR systems measure distance to a target by illuminating the target with pulsed laser light and measuring the reflected pulses with a sensor. Differences in laser return times and wavelengths can then be used to make digital three-dimensional (3-D) representations of the target. The laser light used for LiDAR scan may be ultraviolet, visible, or near infrared. Because using a narrow laser beam as the incident light from the scanner can map physical features with very high resolution, a LiDAR system is particularly suitable for applications such as high-definition map surveys.

The pulsed laser light beams emitted by a LiDAR system are typically directed to multiple directions to cover a field of view (FOV). As a result, LiDAR system requires a receiver that can receive the returned light signals from different directions. To realize this receiving requirement, most LiDAR systems implement one of two designs: (1) a rotational mirror to deflect the return light signals so that they are all received by a static detector, or (2) using an array of detectors to receive the returned light signals within a range of directions.

However, the performance of the conventional rotational mirror, such as galvo, polygon, and MEMS, is limited. In existing LiDAR receivers, it can be difficult to achieve both high-speed detection and large receiving aperture at the same time, features that are desired in a LiDAR receiver. However, in order to achieve a high LiDAR scanning speed, the mirror size has to be sufficiently small, which in turn limits the receiving aperture. Limited aperture leads to less receiving signal, which will limit the detection distance. On the other hand, if a large scanning mirror is used, the scanning speed will be limited, which results in a limited refresh rate of the LiDAR. In other words, in existing LiDAR receivers, there is a trade-off between the receiving aperture size and the scanning speed.

Embodiments of the disclosure address the above problems by an improved receiver having an EO beam deflecting unit for LiDAR.

SUMMARY

Embodiments of the disclosure provide a receiver for light detection and ranging LiDAR. The receiver includes a beam converging device and an EO beam deflecting unit. The beam converging device is configured to receive a laser beam from an object being scanned by the LiDAR and form an input laser beam. The EO beam deflecting unit is configured to generate a non-uniform medium having at least one of a refractive index gradient or a diffraction grating, receive the input laser beam such that the input laser beam impinges upon the non-uniform medium, and form an output laser beam towards a photosensor. An angle between the input and the output laser beams is nonzero.

Embodiments of the disclosure also provide another receiver for LiDAR. The receiver includes an EO beam deflecting unit and a beam converging device. The beam deflecting unit is configured to generate a non-uniform medium having at least one of a refractive index gradient or a diffraction grating, receive an input laser beam from an object being scanned by the LiDAR such that the input laser beam impinges upon the non-uniform medium, and form an output laser beam towards a photosensor. An angle between the input laser beam and the output laser beams is nonzero. The beam converging device is configured to receive the output laser beam and form a second input laser beam towards the photosensor.

Embodiments of the disclosure also provide a method for receiving a laser beam in a LiDAR. The method includes the following operations. At first, a travel direction of the laser beam from an object being scanned by the LiDAR to a photosensor is determined. In an electro-optical (EO) deflector, a non-uniform medium that deflects light is generated. The laser beam from the object is received by the EO deflector such that the laser beam impinges upon the non-uniform medium. The laser beam is deflected by the EO deflector towards the photosensor.

It is to be understood that both the foregoing general description and the following detailed description are exemplary and explanatory only and are not restrictive of the invention, as claimed.

BRIEF DESCRIPTION OF THE DRAWINGS

FIG. 5A illustrates a schematic diagram of another exemplary EO beam deflecting unit, according to embodiments of the disclosure.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

The present disclosure is made in a three-dimensional coordinate system, with x-axis, y-axis, and z-axis representing the three dimensions. In the present disclosure, the "fast axis" is parallel to the z-axis, the "slow axis" is parallel to the y-axis, and the "optical axis" is parallel to the x-axis. The z-axis (e.g., the vertical axis/direction) can be perpendicular to the x-y plane (e.g., the horizontal/lateral plane), and the x-axis and the y axis can be perpendicular to each other. The x-axis/direction and the y-axis/direction can each be referred to as a lateral direction.

In the present disclosure, the "incident direction" of a light beam refers to the direction defined by the incident angle between the light beam and the surface normal of the object the light beam is incident on. In the present disclosure, the "exiting direction" of a light beam refers to the direction defined by the exiting angle between the light beam and the surface normal of the object the light beam is exiting.

In the present disclosure, an "incident surface" refers to the surface on which a light beam is incident, and an "exiting surface" refers to the surface from which a light beam is exiting. In some applications, incident and exiting surfaces of an object (e.g., an EO crystal) are located at the opposing sides of the object.

In the present disclosure, a "top end" refers to a portion of an object (e.g., an EO crystal) that has a higher elevation along the z-axis, and a "bottom end" refers to a portion of the object that has a lower elevation along the z-axis.

In the present disclosure, the term "nominal/nominally" refers to a desired, or target, value of a characteristic or parameter for a component or a process operation, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

In the present disclosure, the distance between two objects, e.g., a lens and an EO beam deflecting unit, is defined to be the distance between the centers (e.g., geometric centers) of the objects.

Figure 1:
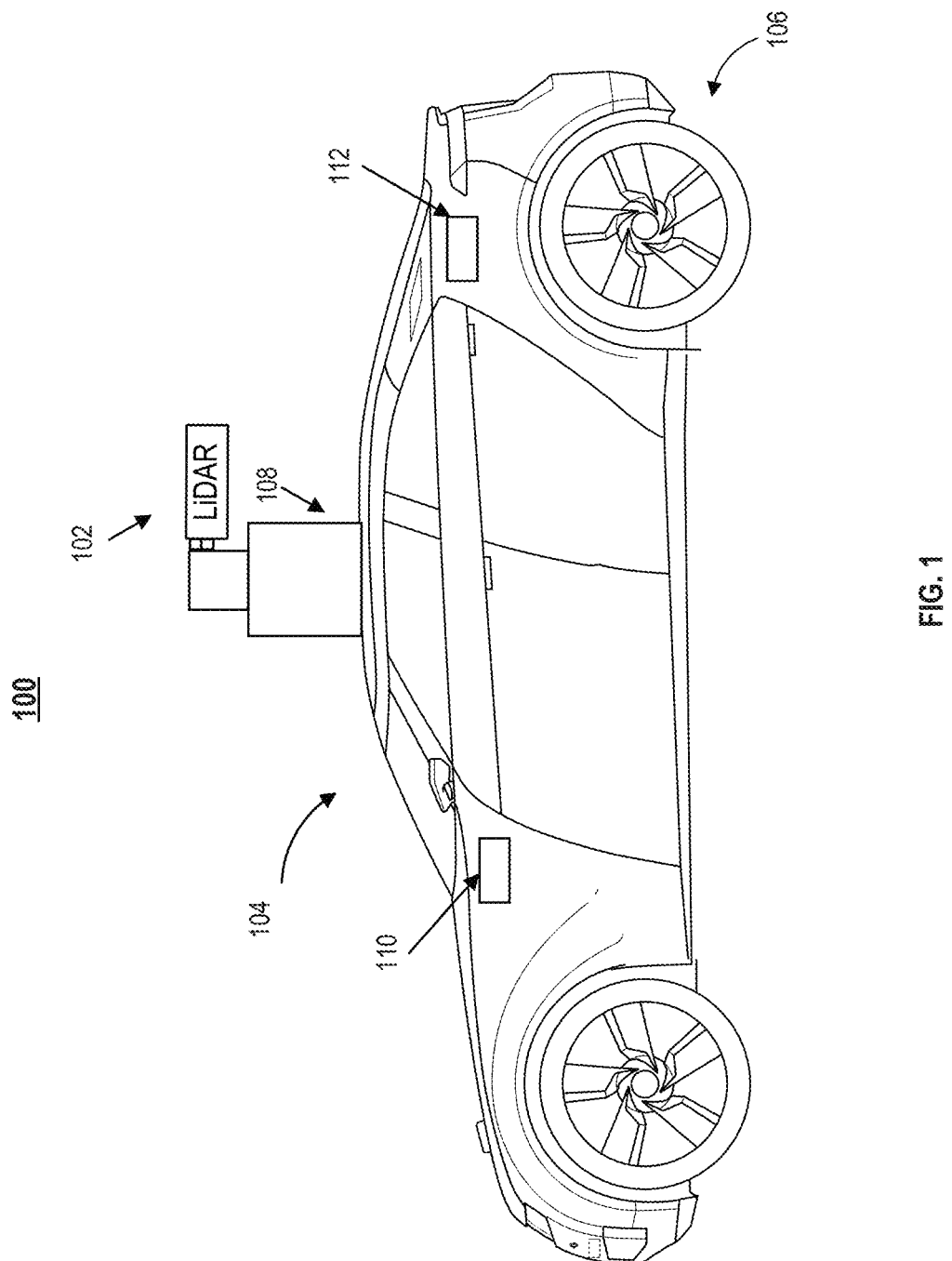
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring data for constructing a high-definition map or 3-D buildings and city modeling. It is contemplated that vehicle 100 may be any suitable moving vehicle such as an electric vehicle, a fuel cell vehicle, a hybrid vehicle, or a conventional internal combustion engine vehicle. Vehicle 100 may have a body 104 and at least one wheel 106. Body 104 may be any body style, such as a sports vehicle, a coupe, a sedan, a pick-up truck, a station wagon, a sports utility vehicle (SUV), a minivan, or a conversion van. In some embodiments of the present disclosure, vehicle 100 may include a pair of front wheels and a pair of rear wheels, as illustrated in FIG. 1. However, it is contemplated that vehicle 100 may have less wheels or equivalent structures that enable vehicle 100 to move around. In some embodiments of the present disclosure, vehicle 100 may be configured to be operated by an operator occupying the vehicle, remotely controlled, and/or autonomous.

As illustrated in FIG. 1, vehicle 100 may be equipped with LiDAR system 102 mounted to body 104 via a mounting structure 108. Mounting structure 108 may be an electro-mechanical device installed or otherwise attached to body 104 of vehicle 100. Vehicle 100 may be additionally equipped with a sensor 110 inside or outside body 104 using any suitable mounting mechanisms. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3-D sensing performance.

Consistent with some embodiments, LiDAR system 102 and sensor 110 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser light and measuring the reflected pulses with a receiver. The laser light used for LiDAR system 102 may be ultraviolet, visible, or near infrared. In some embodiments of the present disclosure, LiDAR system 102 may capture point clouds. As vehicle 100 moves along the trajectory, LiDAR system 102 may continuously capture data. Each set of scene data captured at a certain time range is known as a data frame.

As illustrated in FIG. 1, vehicle 100 may be additionally equipped with sensor 110, which may include sensors used in a navigation unit, such as a Global Positioning System (GPS) receiver and one or more Inertial Measurement Unit (IMU) sensors.

Consistent with the present disclosure, vehicle 100 may include a local controller 112 inside body 104 of vehicle 100 or communicate with a remote computing device, such as a server (not illustrated in FIG. 1), for controlling the operations of LiDAR system 102 and sensor 110. In some embodiments of the present disclosure, controller 112 may have different modules in a single device, such as an integrated circuit (IC) chip (implemented as an application-specific integrated circuit (ASIC) or a field-programmable gate array (FPGA)), or separate devices with dedicated functions. In some embodiments of the present disclosure, one or more components of controller 112 may be located inside vehicle 100 or may be alternatively in a mobile device, in the cloud, or another remote location. Components of controller 112 may be in an integrated device or distributed at different locations but communicate with each other through a network (not shown).

Figure 2:
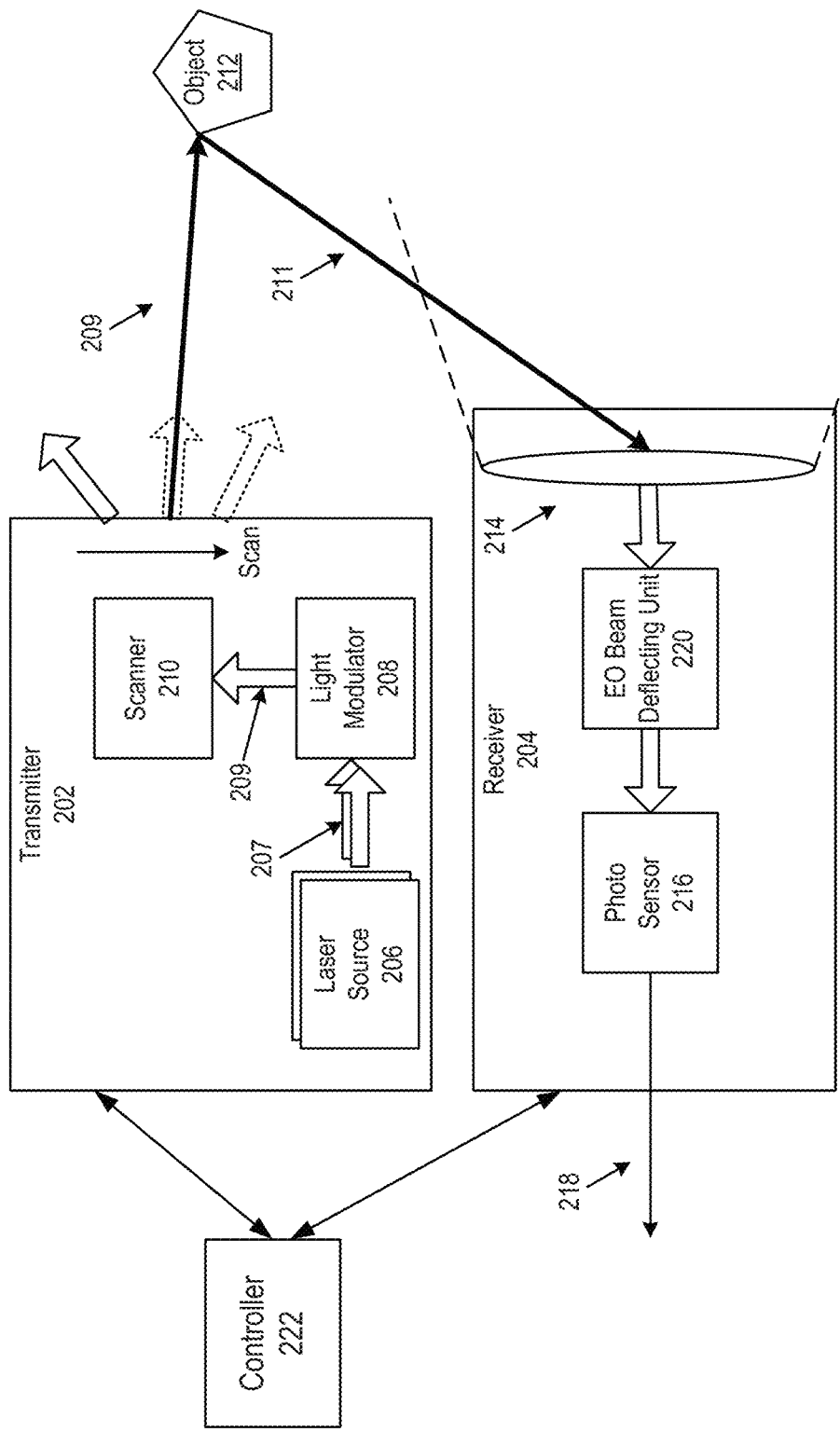
FIG. 2 illustrates a block diagram of an exemplary LiDAR system having a receiver with an EO beam deflecting unit, according to embodiments of the disclosure.

FIG. 2 illustrates a block diagram of an exemplary LiDAR system 102 having a receiver 204 with an EO beam deflecting unit 220, according to embodiments of the disclosure. LiDAR system 102 may include a transmitter 202, receiver 204, and a controller 222. Transmitter 202 may emit laser beams within a scan angle. Transmitter 202 may include one or more laser sources 206, light modulator 208, and a scanner 210.

As part of LiDAR system 102, transmitter 202 can sequentially emit a stream of pulsed laser beams in different directions within its scan angle, as illustrated in FIG. 2. A laser source 206 may be configured to provide a native laser beam 207 in a respective incident direction to light modulator 208. In some embodiments of the present disclosure, each laser source 206 may generate one or more pulsed laser beams in the ultraviolet, visible, or near infrared wavelength range.

Laser source 206 can include any suitable laser emitting device(s) such as one or more pulsed laser diode (PLD). Depending on the light-emitting materials (e.g., semiconductor materials) in the laser emitting devices, the wavelength of native laser beam 207 provided by a PLD may be any suitable value(s) that can be detected by receiver 204. For example, the wavelength of native laser beam 207 may be smaller than 1,100 nm, such as 405 nm, between 445 nm and 465 nm, between 510 nm and 525 nm 532 nm, 635 nm, between 650 nm and 660 nm, 670 nm, 760 nm, 785 nm, 808 nm, 848 nm, or 905 nm. Light modulator 208 can spatially collimate and combine multiple laser beams provided by multiple laser sources 206 into a single combined laser beam and minimize the beam divergence in the combined laser beam.

Scanner 210 may be configured to emit combined laser beam 209 to an object 212 in a scanning direction. Scanner 210 may scan object 212 using combined laser beam 209 combined by light modulator 208, within a scan angle at a scan raze. Object 212 may be made of a wide range of materials including, for example, non-metallic objects, rocks, rain, chemical compounds, aerosols, clouds and even single molecules. The wavelength of combined laser beam 209 may vary based on the composition of object 212. At each time point during the scan, scanner 210 may emit combined laser beam 209 to object 212 in the scanning direction within the scan angle. Scanner 210 may also include optical components (e.g., lenses, mirrors) that can focus pulsed laser light into a narrow laser beam to increase the scan resolution and range of object 212.

As part of LiDAR system 102, receiver 204 may be configured to detect a returned laser beam 211 from object 212 in a direction other than the scanning direction. After collecting and sensing the laser beams, receiver 204 can output an electrical signal reflecting the intensity of the returned laser beams. Upon contact, combined laser beam 209 can be reflected by object 212 via backscattering, such as Rayleigh scattering, Mie scattering, Raman scattering, and fluorescence, forming returned laser beam 211 towards receiver 204. Returned laser beam 211 may be returned from object 212 and have the same wavelength as combined laser beam 209. As illustrated in FIG. 2, receiver 204 may include a lens 214, a photosensor 216, and an EO beam deflecting unit 220, consistent with the embodiments of the present disclosure. For illustrative purposes, in FIG. 2, EO beam deflecting unit 220 is depicted to be positioned between lens 214 and photosensor 216. As described below, EO beam deflecting unit 220 can be placed between lens 214 and photosensor 216, and/or between object 212 and lens 214. The actual placement of EO beam deflecting unit 220 should not be limited by the depiction in the figures. Lens 214, as a beam converging device, may be configured to collect light from a respective direction in its field of view (FOV). At each time point during the scan, returned laser beam 211 may be collected by receiver 204, e.g., by lens 214 or EO beam deflecting unit 220, as described in detail as follows.

As previously explained, in an existing LiDAR system, high scanning speed and large scanning aperture can be difficult to achieve at the same time due to limitations of the conventional receiver. The existing receiver often includes a rotational mirror that can rotate to alter the travel direction of a returned laser beam after it passes the lens such that the reflected laser beam travels towards the photosensor. The rotational mirror can have several limitations. For example, the rotational mirror is often composed of instruments such as a mirror galvanometer, a polygon mirror, a micro-electromechanical system (MEMS), and the like. The limitations of the rotational mirror, consisting of these instruments, can be related to the size of the rotational mirror. If the LiDAR system has a high scanning speed (e.g., and high refreshing rate), the size of the rotational mirror needs to be desirably small so that the rotational mirror can be quickly adjusted/oriented to a desired angle to deflect the returned laser beam to the photosensor. However, a rotational mirror with a relatively small size often has a smaller receiving aperture, limiting the detection distance. That is, the performance of an existing receiver is limited by this trade-off between high scanning speed and large scanning aperture.

The present disclosure provides a LiDAR system with an improved receiver by employing an EO beam deflecting unit. With the EO beam deflecting unit, the disclosed LiDAR receiver provides improved accommodation to high scanning speed and larger scanning aperture at the same time. Compared to an existing LiDAR system, the performance of the receiver is less (or not) limited by the size of the EO beam deflecting unit. The EO beam deflecting unit may include one or more EO deflectors, which can be placed at any suitable locations along the travel path of the returned laser beam to deflect the returned laser beam towards the photosensor. In various applications, by configuring/optimizing the number, positions, and orientations of each EO deflector in the receiver, the returned laser beam can be deflected to a smaller sensing area, compared to an existing LiDAR system. As a result, a photosensor with a smaller photodetector array or even a single photodetector, can be used for the light detection and collection.

As described in the embodiments of the present disclosure, the light deflection functions of the EO beam deflecting unit is based on the deflection angle of the EO beam deflecting unit. The deflection angle is correlated to the refractive index of the EO beam deflecting unit, which is modulated by a voltage potential applied to the EO material body (e.g., an EO crystal) of the EO beam deflecting unit. The EO material body responds to the voltage potential and forms a non-uniform medium, which can include a refractive index gradient or a diffraction grating. In some embodiments, the voltage potential is applied across the EO material body by a pair of electrodes at the top and bottom ends of the EO material body, forming a refractive index gradient between top and bottom ends of the EO material body. In some alternative embodiments, the voltage potential is applied across the EO material body by a pair of transparent electrodes at the incident and exiting surfaces of the EO material body, forming a diffraction grating in the EO material body. At least one of the transparent electrodes is patterned to form the diffraction grating. That is, the refractive index of the EO beam deflecting unit is modulated to be a function of the voltage potential applied to the EO beam deflecting unit. The value of the voltage potential is varied to dynamically modulate the refractive index such that a desired deflection angle can be reached. In various embodiments, each returned laser beam is directed to be incident on the non-uniform medium, and the refractive index of the EO beam deflecting unit is dynamically modulated and/or adjusted to receive each returned laser beam such that it can be deflected to the photosensor at a desired travel direction. Because the EO beam deflecting unit reflects the light at its material's electric-optical response time to an electrical signal (e.g., the voltage potential), the speed of receiver 204 is determined by this response time rather than its size. The EO response time can be desirably short or shorter than the time to adjust a rotational mirror in an existing receiver, so that the laser beam is timely deflected. In the meantime, the size of the EO beam deflecting unit can be designed smaller than a rotational mirror, allowing the size of the LiDAR system to be smaller. The EO beam deflecting unit thus improves the light energy collection in a LiDAR system.

Figure 3A:
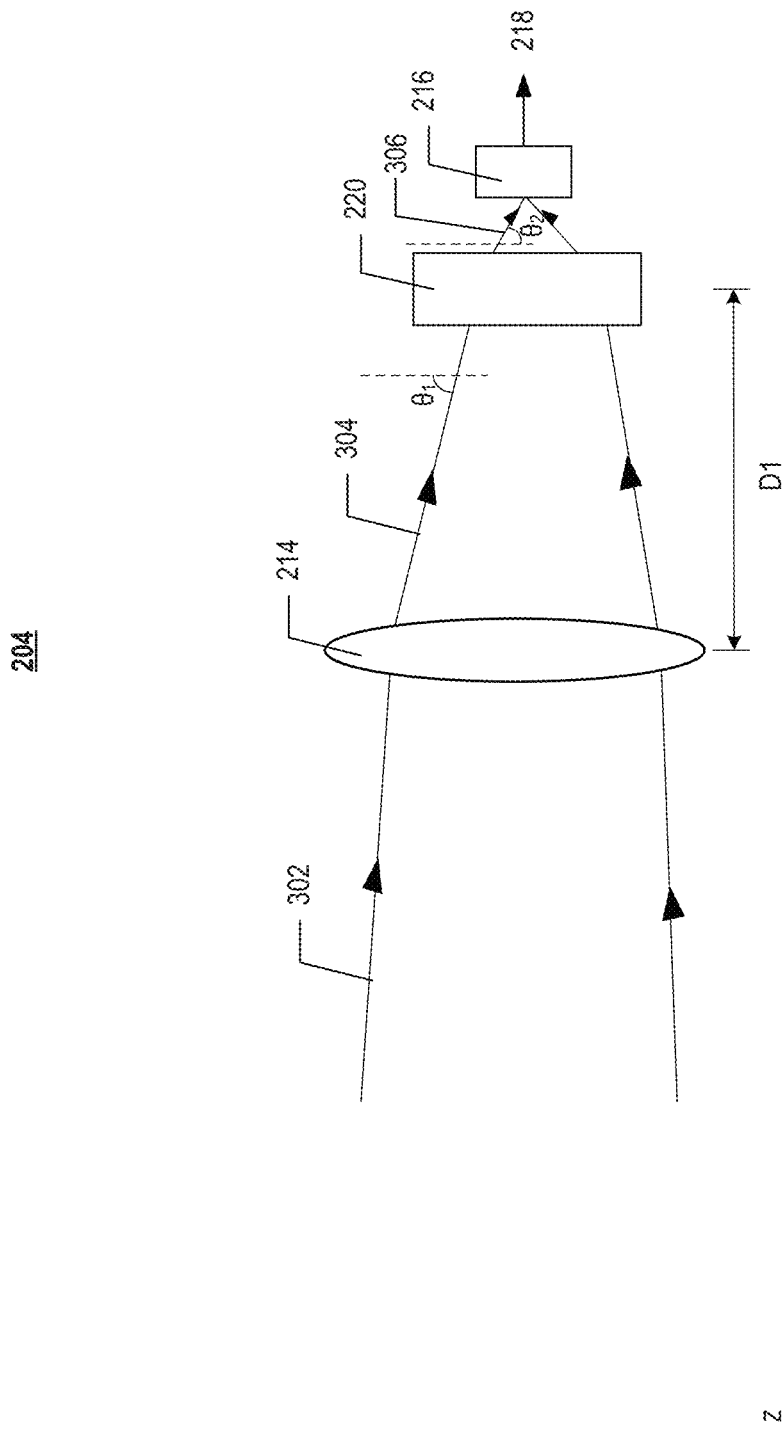
FIG. 3A illustrates a receiver having an exemplary EO beam deflecting unit, according to embodiments of the disclosure.
Figure 3B:
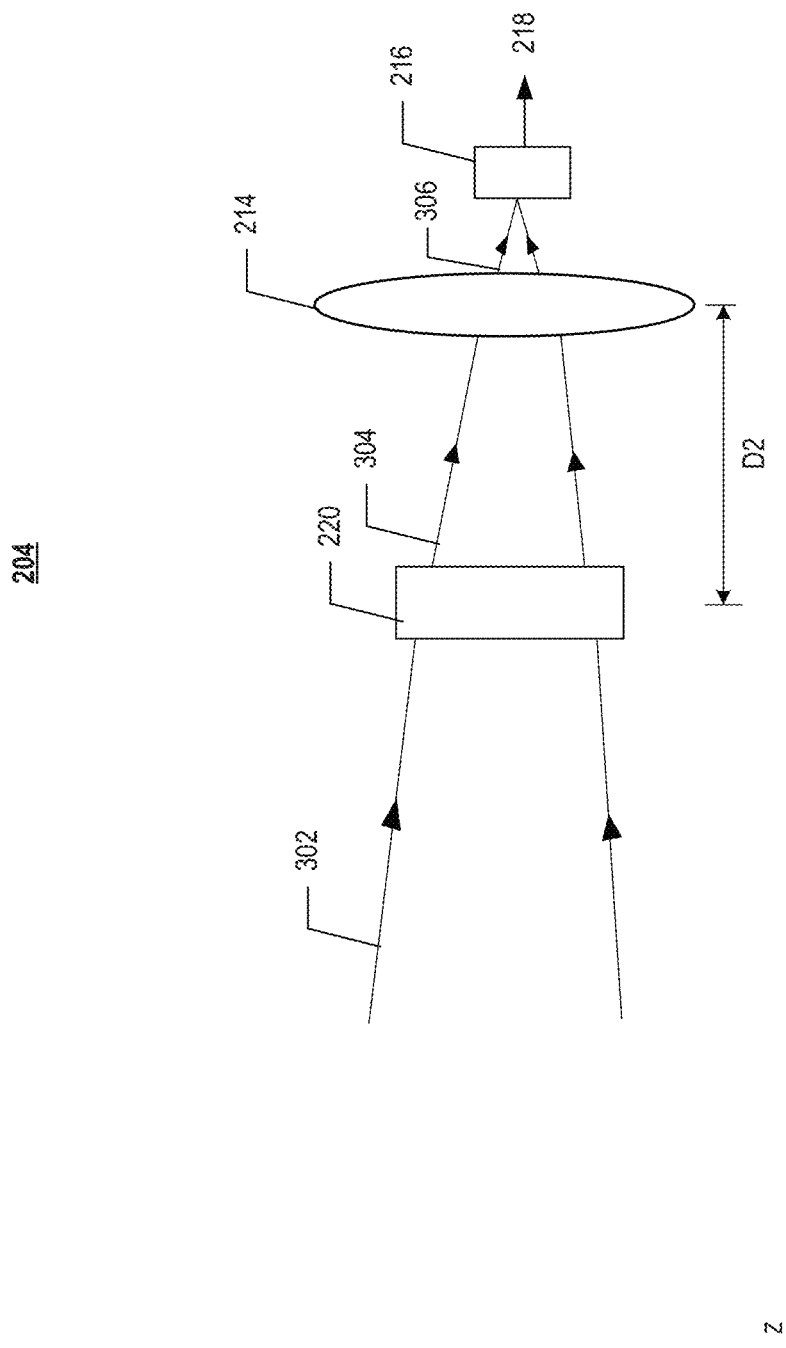
FIG. 3B illustrates another receiver having an exemplary EO beam deflecting unit, according to embodiments of the disclosure.
Figure 3C:
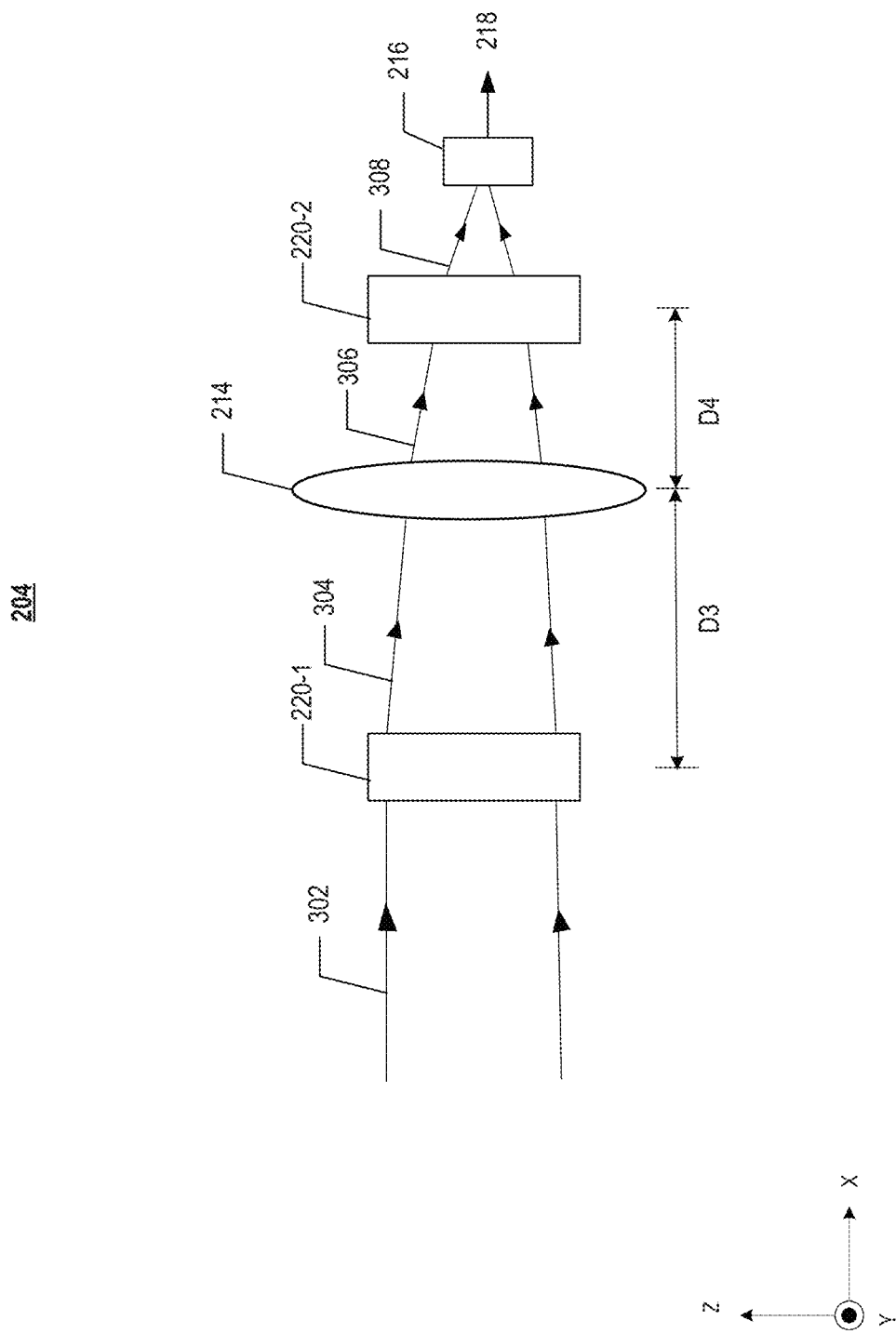
FIG. 3C illustrates yet another receiver having an exemplary EO beam deflecting unit, according to embodiments of the disclosure.

FIGS. 3A, 3B, and 3C each illustrates an exemplary configuration of receiver 204, according to some embodiments. As shown in FIG. 3A, EO beam deflecting unit 220 may be placed between lens 214 and photosensor 216. A first laser beam 302 may represent returned laser beam 211. First laser beam 302 may be incident on and converged by lens 214, forming a second laser beam 304. Second laser beam 304 may be incident on and deflected by EO beam deflecting unit 220, forming a third laser beam 306. Third laser beam 306 may be collected by photosensor 216, which outputs an electrical signal 218 that can be detected by other hardware and/or software, such as controller 222.

EO beam deflecting unit 220 may deflect an input laser beam (e.g., second laser beam 304) to form an output laser beam (e.g., third laser beam 306), which travels towards photosensor 216. That is, EO beam deflecting unit 220 may change the travel direction of the input laser beam and deflect the input laser beam towards photosensor 216 such that the input and output laser beams do not travel in parallel. The angle between the input laser beam and the output laser beam is represented by the difference between the travel directions of the input and output laser beams. In some embodiments, the angle is a nonzero value. In various embodiments, depending on the position of photosensor 216 relative to EO beam deflecting unit 220, the output laser beam can be deflected to any suitable directions by EO beam deflecting unit 220, towards photosensor 216.

As shown in FIG. 3A, second laser beam 304 and third laser beam 306 have different travel directions. For ease of illustration, as shown in FIG. 3A, the acute angle between the travel path of second laser beam 304 and the vertical direction (e.g., the z-axis) is denoted by $\theta_1$, and the acute angle between the travel direction of third laser beam 306 and the vertical direction is denoted by $\theta_2$. Depending on the position of photosensor 216, $\theta_1$ may be greater than or smaller than $\theta_2$. In the embodiment shown in FIG. 3A, $\theta_1$ is greater than $\theta_2$. The deflection angle of EO beam deflecting unit 220 may be equal to the angle between the input laser beam and the output laser beam. In some embodiments, the deflection angle is equal to the difference between $\theta_1$ and $\theta_2$, i.e., $(\theta_1-\theta_2)$.

In some embodiments, the position of EO beam deflecting unit 220 is adjustable (e.g., can be optimized) such that second laser beam 304 can be received on a desired area of EO beam deflecting unit 220. In some embodiments, the position of EO beam deflecting unit 220 is adjusted such that a maximum portion (e.g., all) of second laser beam 304 is deflected. In some embodiments, the optimized position of EO beam deflecting unit 220 also allows third laser beam 306 to be incident on a desired area of photosensor 216. As shown in FIG. 3A, a distance D1 between lens 214 and EO beam deflecting unit 220 can be determined or optimized to be a value that ensures any input laser beam of EO beam deflecting unit 220 (e.g., second laser beam 304) to be deflected onto photosensor 216. In various embodiments, D1 can be a constant value or a variable value. In some embodiments, to adjust D1, EO beam deflecting unit 220 can be coupled to a motor and/or an actuator that can move EO beam deflecting unit 220 during a laser light detection process. In some embodiments, based on the travel direction of first laser beam 302 and/or the relative positions between lens 214 and photosensor 216, the motor/actuator is configured to move EO beam deflecting unit 220, e.g., along the x-axis and/or the y-axis, to timely deflect second laser beam 304 such that third laser beam 306 impinges on photosensor 216. In some embodiments, the motor/actuator is configured to rotate EO beam deflecting unit 220. The motor/actuator may be controlled by a controller 222.

Figure 4A:
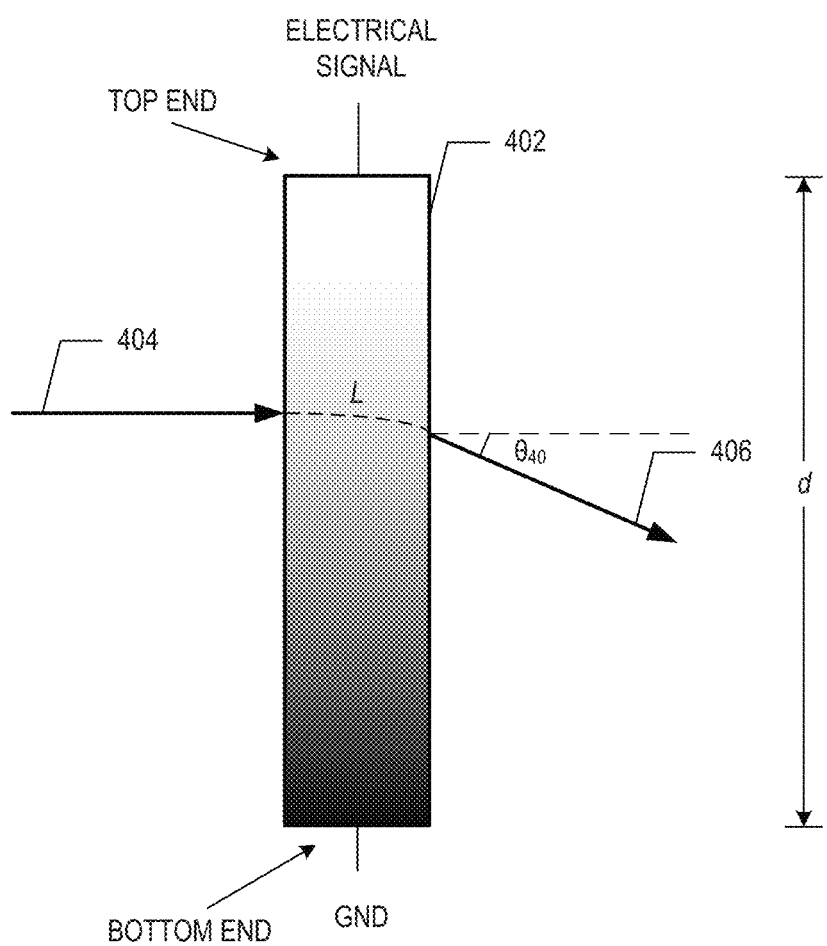
FIG. 4A illustrates a schematic diagram of an exemplary EO beam deflecting unit, according to embodiments of the disclosure.
Figure 4B:
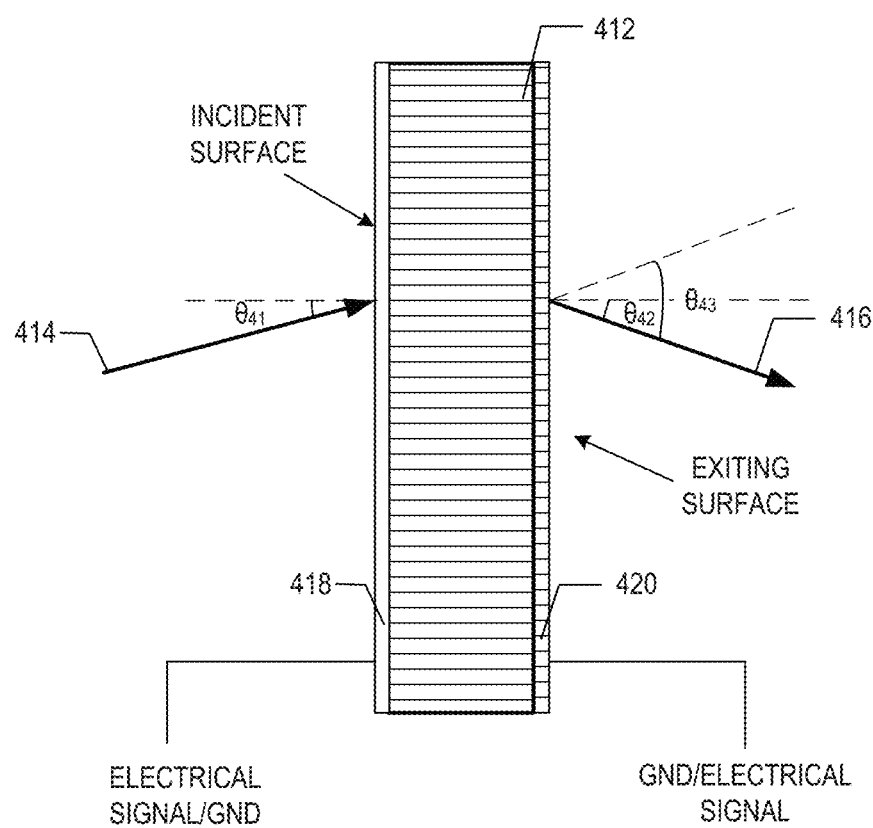
FIG. 4B illustrates a schematic diagram of another exemplary EO beam deflecting unit, according to embodiments of the disclosure.
Figure 5B:
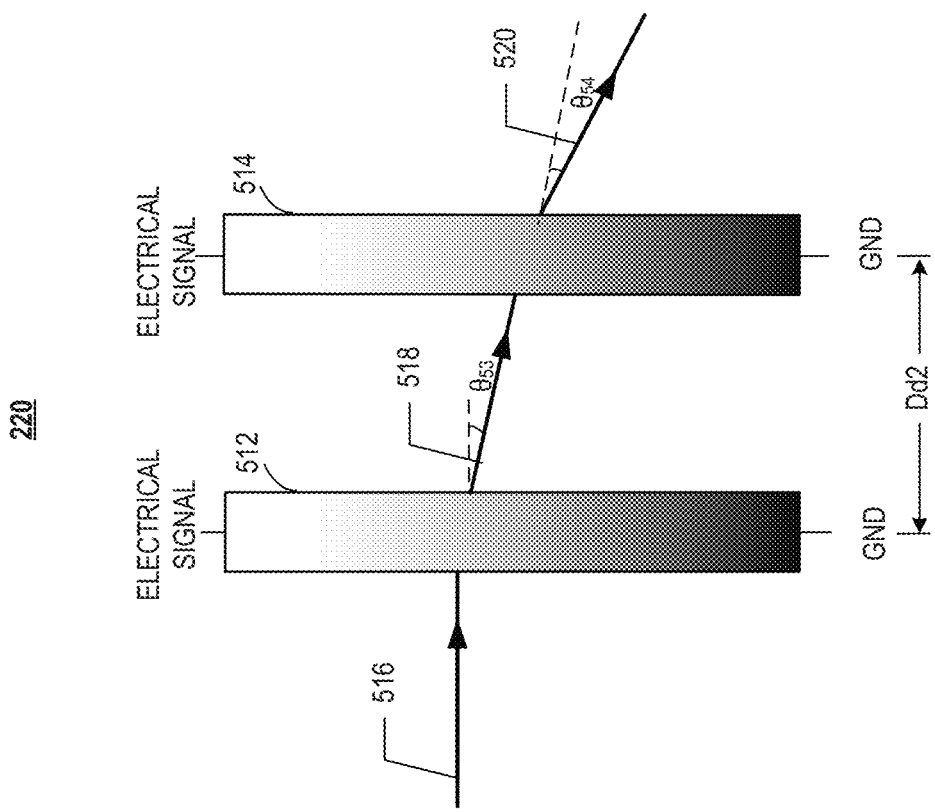
FIG. 5B illustrates a schematic diagram of another exemplary EO beam deflecting unit, according to embodiments of the disclosure.

The deflection angle of EO beam deflecting unit 220 can at least be partially determined by the configuration and working mechanism of EO beam deflecting unit 220. In various embodiments, EO beam deflecting unit 220 includes one or more EO deflectors, each having a respective deflection angle. The deflection angle of EO beam deflecting unit 220 may be a combination (e.g., a sum) of the deflection angles of the individual EO deflectors. FIGS. 4A, 4B, illustrate schematic views of EO beam deflecting unit 220 with a single EO deflector while FIGS. 5A, and 5B illustrate schematic views of EO beam deflecting unit 220 with a pair of EO deflectors, respectively. In various embodiments, EO beam deflecting unit 220 may also include more than two EO deflectors. However, because embodiments of EO beam deflecting unit 220 with more than two EO deflectors can be explained in a manner similar to that in FIGS. 5A and 5B, these embodiments are not described in detail. The number of EO deflectors in EO beam deflecting unit 220 thus should not be limited by the illustrated embodiments of the present disclosure.

The light deflection function of EO beam deflecting unit 220 can be realized by applying a voltage potential on an EO material body, e.g., an EO crystal, in EO beam deflecting unit 220. The EO material body may include any suitable material that has an electro-optic effect in response to an applied electric field. When an electric field is applied across an EO crystal (or a portion of the EO crystal), the refractive index of the EO crystal may change (e.g., be modulated) as a function of the magnitude/strength of the electric field. Some EO crystals, such as ZnSe, are referred to as Pockels EO crystals, of which a refractive index change ($\Delta n$) is linearly proportional to the magnitude of the electric field (E). Some EO crystals, such as ammonium dihydrogen phosphate (ADP), are referred to as Kerr EO crystals, of which the of refractive index change ($\Delta n$) is proportional to the square of the magnitude of the electric field ($E^2$). For a Pockels EO crystal, the deflection angle may be described as $$\theta = K1\frac{LV}{d^2},$$

in which K1 represents a constant determined by the EO crystal, V represents the voltage potential, L represents the propagating length of the laser beam, and d represents the thickness of the EO crystal. For a Kerr EO crystal, the deflection angle may be described as $$\theta = K2\frac{LV^2}{d^3},$$

in which K2 represents a constant determined by the EO crystal, V represents the voltage potential, L represents the propagating length of the laser beam, and d represents the thickness of the EO crystal.

In various embodiments, depending on the desired angle between the input and output laser beams of EO beam deflecting unit 220 (or the desired range of such angles), the respective deflection angle of each EO deflectors is determined. To form the desired deflection angle of an EO deflector, various parameters may be adjusted, e.g., the EO crystal in the EO deflector, the modulation of refractive index in the EO crystal, and/or the voltage potential to be applied. In various embodiments, the EO material body of each EO deflector can include one or more of ZnSe, ZnTe, potassium dihydrogen phosphate (KDP), LiNbO$_3$, BaTiO$_3$, LiTaO$_3$, KTiOPO$_4$, lithium niobate (LN), ammonium dihydrogen phosphate (ADP), SrTiO$_3$, lead zirconate titanate (PLZT), potassium tantalum niobate (KTN), and cadmium telluride (CdTe). The EO deflectors in the same EO beam deflecting unit 220 may include the same EO crystal or different EO crystals.

When a voltage potential is applied on the EO material body of an EO deflector, a non-uniform medium is formed in the EO material body. The non-uniform medium may deflect the input laser beam to form the output laser beam, by a respective deflection angle. In some embodiments, the EO deflector is moved and/or rotated by the motor/actuator so that the respective non-uniform medium receives the input laser beam at a desired orientation/angle. Depending on the direction of the electric field (or the positions of the electrodes by which the voltage potential is applied), a refractive index gradient or a diffraction grating can be formed in the non-uniform medium. In some embodiments, dopants (or impurities) are formed in the EO crystal to further adjust the refractive index of the respective non-uniform medium. The refractive index gradient and the diffraction grating can each be configured using a suitable voltage potential. Examples below are illustrated in detail to explain the working mechanisms of EO beam deflecting unit 220.

FIG. 4A illustrates an EO deflector 402 in EO beam deflecting unit 220. EO deflector 402 deflects a laser beam based on a refractive index gradient on which the laser beam impinges. An input laser beam 404 may be received by EO deflector 402 on one side (e.g., on an incident surface). Input laser beam 404 may be deflected by EO deflector 402 and exit from the other side (e.g., from an exiting surface), forming an output laser beam 406. Input laser beam 404 may impinge on EO deflector 402 from any suitable direction. As an example, the incident angle of input laser beam 404 is a right angle. A deflection angle, e.g., between input and output laser beams 404 and 406, is represented by $\theta_{40}$, which is equal to the exiting angle of output laser beam 406 in this example. EO deflector 402 may include a non-uniform medium formed by an EO material body applied with a voltage potential. The EO material body may be made of any suitable EO crystals of which the refractive indices can be modulated by an electric field formed by the voltage potential. In various embodiments, as previously described, EO deflector 402 may include ZnSe, ZnTe, KDP, LiNbO$_3$, BaTiO$_3$, LiTaO$_3$, KTiOPO$_4$, LN, ADP, SrTiO$_3$, PLZT, KTN, and/or CdTe.

In operation, a voltage potential (shown in the figures as an "electrical signal") can be applied on the EO material body such that an electric field is formed across the EO material body. In some embodiments, the voltage potential is applied at electrodes at the top end and the bottom end of the EO material body, as shown in FIG. 4A, and an electric field is formed between the electrodes, e.g., being perpendicular to the electrodes throughout the EO material body. In some embodiments, the top and bottom ends of the EO material body are located on different sides of input laser beam 404 along the z-axis. The electric field can cause a space charge to form in the EO material body, and a refractive index gradient can be formed along the direction of the electric field, e.g., between the electrodes. In various embodiments, depending on the orientation of EO deflector 402, the electric field may be along any suitable direction that is perpendicular to the y-axis. Depending on the voltage potential, the refractive index may gradually increase or decrease from the top end to the bottom end of the EO material body (e.g., between the electrodes). Input laser beam 404 may propagate in the EO material body, and be cumulatively refracted as it propagates through the EO material body.

To obtain a desired deflection angle $\theta_{40}$, parameters such as the material of the EO material body (i.e., EO crystal), the voltage potential, and the dimensions of EO material body along the z-axis and the x-axis, can be determined or optimized. In various embodiments, the parameters are determined based on equation $$\theta = K1 \frac{LV}{d^2}$$

for Pockels EU crystals, and $$\theta = K2 \frac{LV^2}{d^3}$$

for Kerr EO crystals. In some embodiments, the voltage potential can be kept constant to cause a constant deflection angle. In some embodiments, the voltage potential can be varied to cause a changing or variable deflecting angle. The voltage potential may be provided by an electrical drive signal (not shown in the figures). Thus, reflection angle $\theta_{40}$ may be determined based on the travel direction of input laser beam 404 and a desired direction of output laser beam 406 (e.g., towards photosensor 216).

In some embodiments, EO deflector 402 is coupled to a motor/actuator. In some embodiments, based on the travel direction of input laser beam 404 and/or the relative positions between lens 214 and photosensor 216, the motor/actuator is configured to move EO deflector 402, e.g., along the x-axis and/or the y-axis, to timely deflect input laser beam 404 such that output laser beam 406 impinges on photosensor 216. In some embodiments, the motor/actuator is configured to rotate EO deflector 402 so that input laser beam 404 can be incident on the refractive index gradient at a desired angle, and the value of $\theta_{40}$ can be further adjusted/optimized.

FIG. 4B illustrates another EO deflector 412 in EO beam deflecting unit 220. EO deflector 412 deflects a laser beam based on a diffraction grating on which the laser beam impinges. An input laser beam 414 may be received by EO deflector 422 on one side (e.g., on the incident surface) at an incident angle of $\theta_{41}$. Input laser beam 414 may be deflected by EO deflector 412 and exiting from the other side (e.g., from the exiting surface), forming an output laser beam 416 at an exiting angle of $\theta_{42}$. A deflection angle, e.g., between input and output laser beams 414 and 416, is represented by $\theta_{43}$. EO deflector 412 may include a non-uniform medium formed by an EO material body applied with a voltage potential. The EO material body may be made of any suitable EO crystals of which the refractive indices can be modulated by an electric field formed by the voltage potential. In various embodiments, as previously described, EO deflector 412 may include ZnSe, ZnTe, KDP, LiNbO$_3$, BaTiO$_3$, LiTaO$_3$, KTiOPO$_4$, LN, ADP, SrTiO$_3$, PLZT, KTN, and/or CdTe.

In operation, a voltage potential (shown in the figures as an "electrical signal") can be applied between the incident and exiting surfaces of the EO material body by a pair of electrodes 418 and 420, as shown in FIG. 4B, such that an electric field is formed between electrodes 418 and 420. Electrodes 418 and 420 may be coated respectively on the incident and exiting surfaces. The electric field may be perpendicular to electrodes 418 and 420. The electric field may cause a diffraction grating (e.g., an optical diffraction grating) to be formed across the EO material body in the area covered by electrodes 418 and 420. At least one of electrodes 418 and 420 are patterned. The electrode pattern(s) may at least nominally match the pattern of the diffraction grating. In some embodiments, the patterned electrode includes a plurality of strips extending along the y-axis, and a length of each strip (e.g., along the z-axis) is nominally equal to the period of the diffraction grating. In some embodiments, electrodes 418 and 420 can each be a patterned electrode. In some embodiments, electrodes 418 and 420 may have a sufficiently high light transmission rate such that little or no loss of light is caused when the laser beam is transmitted and deflected in the EO material body. In some embodiments, electrodes 418 and 420 are transparent electrodes that include conductive material(s) such as indium tin oxide (ITO).

A suitable combination of patterns of electrodes 418 and 420 can be employed to generate the desired diffraction grating. In some embodiments, one of electrodes 418 and 420 has a patterned conductive film, and the other one has an unpatterned conductive film. The electrode with the patterned conductive film can be placed on one of the incident and exiting surfaces, and the electrode with the unpatterned conductive film can be placed on the other one of the incident and exiting surfaces. One of electrodes 418 and 420 can be connected the electrical signal, and the other one is connected to the ground (GND). In an example, as shown in FIG. 4B, electrode 418, on the incident surface, is an unpatterned conductive film and receive the electrical signal, while electrode 420, on the exiting surface, is a patterned electrodes and connected to GND. In some other embodiments, electrode 418, on the incident surface, is an unpatterned conductive film connected to GND, while electrode 420, on the exiting surface, is a patterned electrode and receive the electrical signal. When a voltage is applied on electrodes 418 and 420 between the incident and exiting surfaces, the refractive index of the portions of the EO material body covered by the patterned electrode 420 may be modulated to increase or decrease, resulting a periodic change of refractive index along the z-axis. The optical diffraction grating may then be formed. A laser beam, incident on the incident surface, may be deflected and outputted at the exiting surface. The angle of the first-order diffraction signal can be described as $$\theta_o = \arcsin\left(\sin\theta_i - \frac{\lambda}{d}\right),$$

in which $\theta_0$ represents the angle of the first-order diffraction signal, $\theta_i$ represents the incident angle, $\lambda$ represents the wavelength of the laser beam, and d represents the period of the diffraction grating (or the length of the strip of electrode 420). In this equation, $\theta_o$ and $\theta_i$ each represents the angle between the direction of the laser beam and the respective surface normal. In some embodiments, only the first-order diffraction signal is considered as the output laser beam described in this disclosure, and is collected by photosensor 216 for further processing. The deflection angle may then be equal to the angle between the directions of laser beam at the incident surface and the exiting surface, e.g., $(\theta_o+\theta_i)$. In various embodiments, incident angle $\theta_i$ may take zero and any suitable non-zero values.

Referring back to FIG. 4B, $B_L$ is represented by incident angle $\theta_{41}$, and $\theta_o$ is represented by exiting angle $\theta_{42}$. Based on the equation described above, $$\theta_{42} = \arcsin\left(\sin\theta_{41} - \frac{\lambda}{d}\right),$$

and deflection angle $\theta_{43}$ is equal to $(\theta_{41}+\theta_{42})$. In some embodiments, EO deflector 412 is coupled to a motor/actuator. In some embodiments, based on the travel direction of input laser beam 414 and/or the relative positions between lens 214 and photosensor 216, the motor/actuator is configured to move EO deflector 412, e.g., along the x-axis and/or the y-axis, to timely deflect input laser beam 414 such that output laser beam 416 impinges on photosensor 216. In some embodiments, the motor/actuator is configured to rotate EO deflector 412 so that input laser beam 414 can be incident on the refractive index gradient at a desired angle. The value of $\theta_{43}$ can accordingly be further adjusted/optimized, and the diffraction loss can be minimized.

EO beam deflecting unit 220 may include one EO deflector (e.g., EO deflectors 402 or 412) or more than one EO deflectors. The more than one EO deflectors in the same EO deflecting unit 220 may be configured based on the same working mechanism (e.g., one of refractive index gradient and diffraction grating), or different working mechanisms (e.g., both of refractive index gradient and diffraction grating). Each EO deflector may be designed and/or optimized separately to ensure EO beam deflecting unit 220 has a desired deflection angle and minimal loss.

FIG. 5A illustrates EO beam deflecting unit 220 having two EO deflectors 502 and 504 operating under different working mechanisms. As an example, EO deflector 502 includes a non-uniform medium that includes a diffraction grating, and EO deflector 504 includes a non-uniform medium that includes a refractive index gradient. The electrodes of EO deflector 502 are omitted in FIG. 5A for simplicity of illustration. The working mechanism of each one of EO deflectors 502 and 504 may respectively be the same as or similar to that of EO deflector 412 or 402, and the detailed description is not repeated herein. As shown in FIG. 5A, an input laser beam 506 may first be received by EO deflector 502 at an incident angle of $\theta_{50}$, and be deflected by a deflection angle $\theta_{51}$ to form an intermediate laser beam 508. Intermediate laser beam 508 may further be incident on EO deflector 504 and deflected by a deflection angle $\theta$52, forming an output laser beam 510. The angle between input and output laser beams 506 and 510 may be referred to as the total deflection angle (or deflection angle of EO beam deflecting unit 220). The deflection angles of EO deflectors 502 and 504 may be designed to be the same or different. The total deflection angle may be a combination of the respective deflection angles of EO deflectors 502 and 504. In some embodiments, the deflection angle of EO beam deflecting unit 220 is equal to $(\theta_{51}+\theta_{52})$.

A distance between EO deflectors 502 and 504 is represented by Dd1 in FIG. 5A. The value of Dd1 may be determined to control output laser beam 510 to travel in a desired direction, e.g., towards photosensor 216. In some embodiments, EO deflectors 502 and 504 are each coupled to a motor/actuator. In some embodiments, based on the travel directions of input laser beam 506 and intermediate laser beam 508, and/or the relative positions between lens 214 and photosensor 216, the motor/actuators are configured to move EO deflectors 502 and 504, e.g., along the x-axis and/or the y-axis, to timely deflect input laser beam 506 and intermediate laser beam 508 such that output laser beam 510 impinges on photosensor 216. In various embodiments, Dd1 can be a constant value or a changing/variable value. In some embodiments, the motor/actuator is configured to respectively rotate EO deflectors 502 and 504 so that the values of $\theta_{50}$, $\theta_{51}$, and/or $\theta_{52}$ can be further adjusted/optimized. Depending on the directions of input laser beam 506 and intermediate laser beam 508, EO deflectors 502 and 504 may be rotated to have the same or different orientations.

FIG. 5B illustrates EO beam deflecting unit 220 having two EO deflectors 512 and 514 operating under the same working mechanism. As an example, EO deflectors 512 and 514 each includes a non-uniform medium that includes a refractive index gradient. Depending on the voltage potentials applied to EO deflectors 512 and 514, the distributions of refractive index gradients in EO deflectors 512 and 514 may be the same or different. That is, the deflection angles of EO deflectors 512 and 514 may be the same or different. The working mechanism of each one of EO deflectors 512 and 514 may be the same as or similar to that of EO deflector 402, and the detailed description is not repeated herein. As shown in FIG. 5B, an input laser beam 516 may first be received by EO deflector 512 at a right angle, and be deflected by a deflection angle $\theta_{53}$ to form an intermediate laser beam 518. Intermediate laser beam 518 may further be incident on EO deflector 514 and deflected by a deflection angle $\theta_{54}$, forming an output laser beam 520. The angle between input and output laser beams 516 and 520 may be referred to as the total deflection angle (or deflection angle of EO beam deflecting unit 220) and is equal to $(\theta_{53}+\theta_{54})$.

A distance between EO deflectors 512 and 514 is represented by Dd2 in FIG. 5B. Similar to Dd1 illustrated in FIG. 5A, Dd2 may be determined to control output laser beam 510 to travel in a desired direction, e.g., towards photosensor 216. In some embodiments, EO deflectors 512 and 514 are each coupled to a motor/actuator. Similar to EO deflectors 502 and 504, the motor/actuators are configured to move and/or rotate EO deflectors 512 and 514 to timely deflect input laser beam 514 and intermediate laser beam 518. In various embodiments, Dd1 can be a constant value or a changing/variable value. In some embodiments, the motor/actuator is configured to respectively rotate EO deflectors 512 and 514 so that the values of $\theta_{53}$ and $\theta_{54}$ can be further adjusted/optimized. Depending on the directions of input laser beam 516 and intermediate laser beam 518, EO deflectors 512 and 514 may be rotated to have the same or different orientations.

FIG. 3B illustrates another configuration of receiver 204, according to some embodiments. As shown in FIG. 3B, EO beam deflecting unit 220 may be placed between object 212 (referring to FIG. 2) and lens 214. First laser beam 302 may represent returned laser beam 211. First laser beam 302 may be incident on and deflected by EO beam deflecting unit 220, forming second laser beam 304. Second laser beam 304 may be incident on and converged by lens, forming third laser beam 306. Third laser beam 306 may be collected by photosensor 216, which outputs an electrical signal 218 that can be detected by other hardware and/or software, such as controller 222.

Similar to EO beam deflecting unit 220 illustrated in FIG. 3A, first laser beam 302 and second laser beam 304 may respectively be the input and output laser beams of EO beam deflecting unit 220. Second laser beam 304 may be deflected by a deflection angle of EO beam deflecting unit 220 before being received by lens 214. As described in FIGS. 4A, 4B, 5A, and 5B, the deflection angle of EO beam deflecting unit 220 may be equal to the deflection angle of a single EO deflector or a combination of deflection angles of a plurality of EO deflectors. A distance between EO beam deflecting unit 220 and lens 214 may be D2, which can be adjusted through a motor/actuator coupled to EO beam deflecting unit 220, similar to D1. Also, the orientation of EO beam deflecting unit 220 (e.g., each EO deflectors in EO beam deflecting unit 220) can be adjusted/optimized by rotating EO beam deflecting unit 220 using the motor/actuator. The details of the working mechanism described in connection with FIGS. 3A, 4A, 4B, 5A, and 5B may also apply to EO beam deflecting unit 220 in FIG. 3B, and therefore are not repeated herein.

FIG. 3C illustrates another configuration of receiver 204, according to some embodiments. Different from the configurations illustrated in FIGS. 3A and 3B, receiver 204 in FIG. 3C includes two EO beam deflecting units 220-1 and 220-2. As shown in FIG. 3C, EO beam deflecting unit 220-1 may be placed between object 212 (like in FIG. 3B) and lens 214, and EO beam deflecting unit 220-2 may be placed between lens 214 and photosensor 216 (like in FIG. 3A). First laser beam 302 may represent returned laser beam 211. First laser beam 302 may be incident on and deflected by EO beam deflecting unit 220-1, forming a second laser beam 304. Second laser beam 304 may be incident on and converged by lens 214, forming a third laser beam 306. Third laser beam 306 may be incident on and deflected by EO beam deflecting unit 220-2, forming a fourth laser beam 308. Fourth laser beam 308 may be collected by photosensor 216, which outputs an electrical signal 218 that can be detected by other hardware and/or software, such as controller 222.

Similar to those illustrated in FIGS. 3A and 3B, first laser beam 302 and second laser beam 304 of FIG. 3C may respectively be the input and output laser beams of EO beam deflecting unit 220-1, and third laser beam 306 and fourth laser beam 308 may respectively be the input and output laser beams of EO beam deflecting unit 220-2. Second laser beam 304 may be deflected by a deflection angle of EO beam deflecting unit 220-1 before being received by lens 214, and fourth laser beam 308 may be deflected by a deflection angle of EO beam deflecting unit 220-2 before being received by photosensor 216. Referring back to the descriptions of FIGS. 4A, 4B, 5A, and 5B, the deflection angle of EO beam deflecting units 220-1 and 220-2 may respectively be equal to the deflection angle of a single EO deflector or a combination of deflection angles of a plurality of EO deflectors in the respective EO beam deflecting unit. In various embodiments, the deflection angles of EO beam deflecting units 220-1 and 220-2 can be the same or different. The combination of the deflection angles of EO beam deflecting units 220-1 and 220-2 causes output laser beam 308 to travel towards and be received by photosensor 216.

A distance between EO beam deflecting unit 220-1 and lens 214 may be D3, and a distance between lens 214 and EO beam deflecting unit 220-2 may be D4. D3 and D4 can each be adjusted through a respective motor/actuator coupled to EO beam deflecting units 220-1 and 220-2, similar to D1 and D2. Also, the orientation of EO beam deflecting units 220-1 and 220-2 (e.g., the orientation of each EO deflector in the respective EO beam deflecting unit)

can be adjusted/optimized by rotating EO beam deflecting units 220-1 and/or 220-2 using the motors/actuators. The details of the working mechanism described in connection with FIGS. 3A, 3B, 4A, 4B, 5A, and 5B can also apply to EO beam deflecting units 220-1 and 220-2 in FIG. 3C, and therefore are not repeated herein.

Referring back to FIG. 2, Photosensor 216 may include any photo-sensitive material that can convert light (i.e., photons) into an electric current (e.g., electrical signal 218). The electric current is generated when photons are absorbed in the photodiode. By using EO beam deflecting units, returned laser beam 211 can be quickly and effectively detected by photosensor 216. High-speed scanning can be achieved. Also, because the EO beam deflecting units can precisely deflect the input laser beams towards a desired location/direction, a small-sized photosensor 216 may be sufficient to receive the incident laser beam. In some embodiments, photosensor 216 includes a smaller photodetector array (e.g., than existing photodetector array) or even a single photodetector. In some embodiments of the present disclosure, photosensor 216 may include a single photodetector, e.g., a silicon PIN photodiode that utilize the photovoltaic effect to convert optical power into an electrical current.

Controller 222 may be configured to control transmitter 202 and/or receiver 204 to perform detection/sensing operations. In some embodiments, controller 222 may apply and adjust an electrical signal (e.g., a voltage potential) to EO beam deflecting unit 220 (e.g., each EO deflector in EO beam deflecting unit 220) to modulate its refractive index in order to deflect the input laser beam for a desired deflection angle. For example, controller 222 may be configured to determine the magnitude/strength of the electrical signal, according to the desired deflection angle.

Controller 222 may include components (not shown) such as a communication interface, a processor, a memory, and a storage for performing various control functions. In some embodiments, controller 222 may have different modules in a single device, such as an integrated circuit (IC) chip (implemented as, for example, an application-specific integrated circuit (ASIC) or a field-programmable gate array (FPGA)), or separate devices with dedicated functions. In some embodiments, the processor may include any appropriate type of general-purpose or special-purpose microprocessor, digital signal processor, or microcontroller. The memory or storage may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. For example, the memory and/or the storage may be configured to store program(s) that may be executed by the processor to configure EO beam deflecting unit 220 to deflect the laser beams in desired directions.

Figure 6:
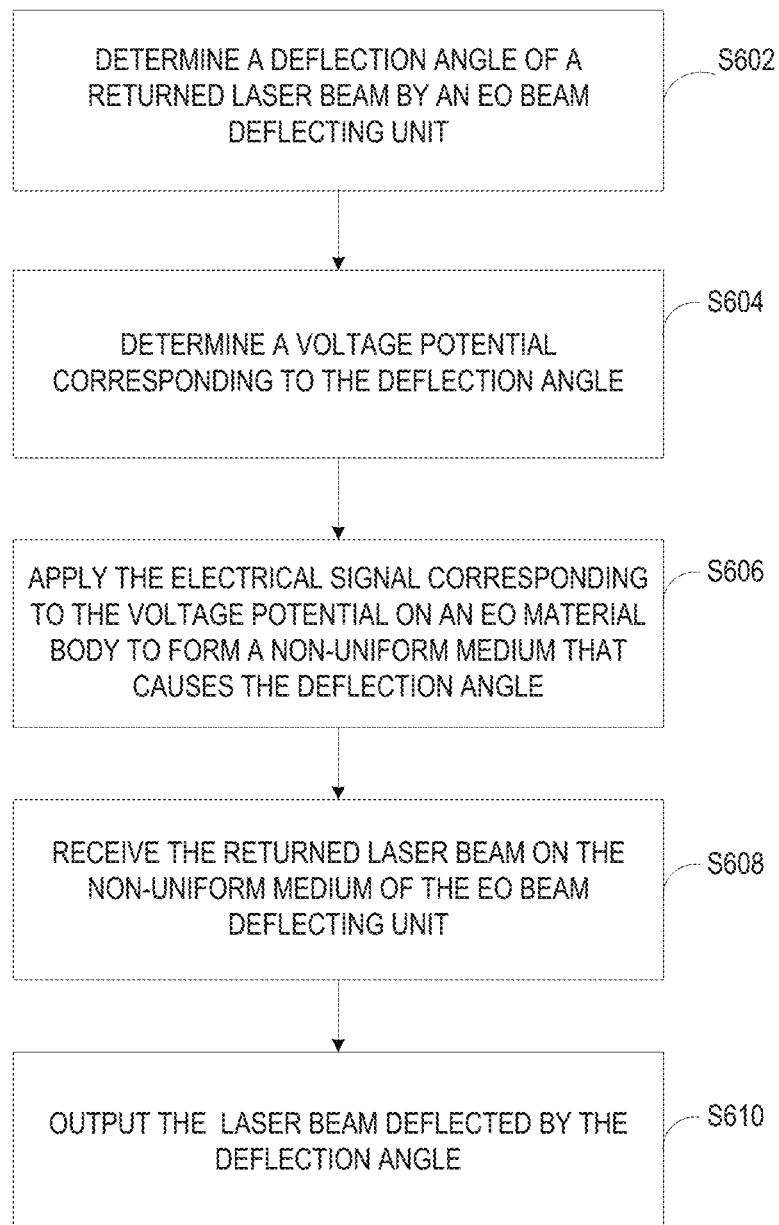
FIG. 6 illustrates a flowchart of an exemplary method to deflect a laser beam using an EO beam deflecting unit, according to embodiments of the disclosure.

FIG. 6 illustrates a method 600 using the disclosed EO beam deflecting unit to deflect laser beams in a receiver of a LiDAR system, according to embodiments of the present disclosure. Method 600 may be performed by automated or manual means. In some embodiments, method 600 is performed by controller 222 along with components of receiver 204.

At step S602, the beginning of method 600, a deflection angle of a returned laser beam by an EO beam deflecting unit is determined. The returned laser beam may be a laser beam emitted by a transmitter of the LiDAR system to an object and then returned from the object. In some embodiments, travel direction of the returned laser beam is determined based on the scanning direction of the laser beam, e.g., before impinging on the object. Based on the travel direction of the returned laser beam and the configuration of the receiver, e.g., dimensions of and distances between components, the deflection angle of the returned laser beam, by the EO beam deflecting unit, can be determined. In some embodiments, the respective deflection angle of each EO deflector in the EO beam deflecting unit is determined.

At step S604, a voltage potential is determined corresponding to the deflection angle. Based on the deflection angle of the EO beam deflecting unit, an electrical field across the EO material body is determined based on the working mechanism of the deflection. In some embodiments, when the EO beam deflecting unit includes more than one EO deflectors, a respective voltage potential to modulate the refractive index of each EO deflector can be determined, such that the output laser beam of the EO beam deflecting unit can travel towards a desired location/direction. Further, the voltage potential corresponding to the electric field can be determined. In some embodiments, for an EO deflector based on a refractive index gradient, the voltage potential is applied between the top and bottom ends of the EO material body. In some embodiments, for an EO deflector based on diffraction grating, the voltage potential is applied between the incident and exiting surfaces of the EO material body.

At step S606, the electrical signal corresponding to the voltage potential is applied to the EO material body of the EO beam deflecting unit to form a non-uniform medium that causes the deflection angle. In some embodiments, each EO deflector in the EO beam deflecting unit is caused to generate a non-uniform medium that includes a refractive index gradient or a diffraction grating, in response to the voltage potential. Each EO deflector may be caused to deflect the respective laser beam by a respective diffraction angle.

At step S608, the returned laser beam is received by the EO beam deflecting unit so that the returned laser beam impinges on the non-uniform medium. When the EO beam deflecting unit includes more than one EO deflectors, the returned laser beam sequentially impinges on and be deflected by each one of the EO deflectors. For ease of illustration, the returned laser beam herein can be the returned laser beam before or after being converged by the lens in the receiver, e.g., similar to the input laser beam described in FIGS. 3A-3C. In some embodiments, the position and/or orientation of each EO deflector in the EO beam deflecting unit is adjusted or optimized such that a maximum portion of the returned laser beam (e.g., all of the returned laser beam) is received on the diffraction grating of each EO deflector. At step S610, the returned laser beam is deflected by the deflection angle. The deflected laser beam may then be outputted by the EO beam deflecting unit.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A receiver for light detection and ranging (LiDAR), comprising:
   a beam converging device configured to receive a laser beam from an object being scanned by the LiDAR and form an input laser beam; and an electro-optical (EO) beam deflecting unit configured to:
   generate a non-uniform medium having at least one of a refractive index gradient or a diffraction grating;
   receive the input laser beam such that the input laser beam impinges upon the non-uniform medium; and
   form an output laser beam towards a photosensor, wherein an angle between the input and the output laser beams is nonzero, wherein the EO beam deflecting unit is coupled to a motor or an actuator controlled by a controller to adjust a distance between the EO beam deflecting unit and the beam converging device.

2. The receiver of claim 1, wherein the non-uniform medium comprises an EO material body comprising at least one of ZnSe, ZnTe, potassium dihydrogen phosphate (KDP), $LiNbO_3$, $LiTaO_3$, BaTiO3, $KTiOPO_4$, ammonium dihydrogen phosphate (ADP), $SrTiO_3$, lead zirconate titanate (PLZT), potassium tantalum niobate (KTN), lithium niobate (LN), cadmium telluride (CdTe).

3. The receiver of claim 2, wherein:
a voltage potential is applied across the EO material body between a top end and a bottom end of the EO material body such that the refractive index gradient is distributed between the top and bottom ends of the EO material body in the non-uniform medium.

4. The receiver of claim 2, wherein:
a second voltage potential is applied across the EO material body between an incident surface and exiting surface of the EO material body such that the diffraction grating is distributed in the EO material body in the non-uniform medium, wherein the second voltage potential is applied through a pair of transparent electrodes respectively coupled to the incident and exiting surfaces of the EO material body.

5. The receiver of claim 3, wherein the EO beam deflecting unit comprises at least one EO deflector and a deflection angle of each respective EO deflector in the EO beam deflecting unit is in accordance with a value of the voltage potential.

6. The receiver of claim 4, wherein the EO beam deflecting unit comprises at least one EO deflector and a deflection angle of each respective EO deflector in the EO beam deflecting unit is in accordance with a pattern of the diffraction grating.

7. The receiver of claim 1, wherein the EO beam deflecting unit comprises an EO deflector placed between the beam converging device and the photosensor.

8. The receiver of claim 7, wherein the EO beam deflecting unit comprises another EO deflector placed between the EO deflector and the photosensor, and wherein the other EO deflector is configured to:
   generate another non-uniform medium having at least one of a second refractive index gradient or another diffraction grating;
   receive an intermediate laser beam from the EO deflector such that the intermediate laser beam impinges upon the other non-uniform medium; and
   form the output laser beam towards the photosensor, wherein an angle between the intermediate and the output laser beams is nonzero.

9. The receiver of claim 8, wherein
the EO deflector deflects the input laser beam by a first deflection angle;
the other EO deflector deflects the intermediate laser beam by a second deflection angle; and
the angle between the input and the output laser beams is equal to a combination of the first deflection angle and the second deflection angle.

10. The receiver of claim 9, wherein the EO deflector and the other EO deflector each comprises one of a respective refractive index gradient or a respective diffraction grating.

11. The receiver of claim 1, wherein the beam converging device comprises a lens and the photosensor comprises a photodetector.

12. A receiver for light detection and ranging (LiDAR), comprising:
an electro-optical (EO) beam deflecting unit configured to:
   generate a non-uniform medium having at least one of a refractive index gradient or a diffraction grating;
   receive an input laser beam from an object being scanned by the LiDAR such that the input laser beam impinges upon the non-uniform medium; and
   form an output laser beam towards a photosensor, wherein an angle between the input laser beam and the output laser beams is nonzero; and
a beam converging device configured to receive the output laser beam and form a second input laser beam towards the photosensor, wherein the EO beam deflecting unit is coupled to a motor or an actuator controlled by a controller to adjust a distance between the EO beam deflecting unit and the beam converging device.

13. The receiver of claim 12, wherein the non-uniform medium comprises an EO material body comprising at least one of ZnSe, ZnTe, potassium dihydrogen phosphate (KDP), $LiNbO_3$, $LiTaO_3$, BaTiO3, $KTiOPO_4$, ammonium dihydrogen phosphate (ADP), $SrTiO_3$, lead zirconate titanate (PLZT), potassium tantalum niobate (KTN), lithium niobate (LN), cadmium telluride (CdTe).

14. The receiver of claim 13, wherein the EO beam deflecting unit comprises an EO deflector, the beam converging device being placed between the EO deflector and the photosensor.

15. The receiver of claim 14, wherein the EO beam deflecting unit further comprises another EO deflector between the beam converging device and the photosensor, wherein the other EO deflector is configured to:
   generate another non-uniform medium having at least one of another refractive index gradient or another diffraction grating;
   receive the second input laser beam from the beam converging device such that the second input laser beam impinges upon the other non-uniform medium; and
   form another output laser beam towards the photosensor.

16. The receiver of claim 13, wherein the beam converging device comprises a lens and the photosensor comprises a photodetector.

17. A method for receiving a laser beam in a light detection and ranging (LiDAR), comprising:
determining a travel direction of the laser beam from an object being scanned by the LiDAR to a photosensor;
generating, in an electro-optical (EO) deflector, a non-uniform medium that deflects light;
adjusting a position of the EO deflector by controlling a motor or an actuator to move the EO deflector based on the determined travel direction;
receiving, by the EO deflector, the laser beam from the object such that the laser beam impinges upon the non-uniform medium; and
deflecting, by the EO deflector, the laser beam towards the photosensor.

18. The method of claim 17, wherein determining the travel direction of the laser beam further comprises:
- determining a deflection angle of the laser beam by the non-uniform medium; and
- generating the non-uniform medium that has one of a refractive index gradient or a diffraction grating.

19. The method of claim 18, wherein generating the non-uniform medium further comprises:
- determining, based on the deflection angle of the laser beam, a refractive index gradient in an EO material body; and
- determining a voltage potential applied on a top end and a bottom end of the EO material body to form the refractive index gradient in the EO material body, a value of the voltage potential corresponding to the refractive index gradient.

20. The method of claim 18, wherein generating the non-uniform medium further comprises:
- determining, based on the deflection angle of the laser beam, a diffraction grating in an EO material body; and
- determining a second voltage potential applied between an incident surface and an exiting surface of the EO material body to form the diffraction grating in the EO material body, a pattern of the second voltage potential corresponding to the diffraction grating.

* * * * *